(12) United States Patent
Nordmark et al.

(10) Patent No.: US 9,635,145 B2
(45) Date of Patent: *Apr. 25, 2017

(54) SYSTEM AND METHOD FOR MODIFYING, IN A PROCESSING PIPELINE, A LENGTH OF A DATA PACKET IN A DATA BLOCK WITHOUT MODIFYING A LENGTH OF THE DATA BLOCK

(71) Applicant: Marvell International Ltd., Hamilton (BM)

(72) Inventors: Gunnar Nordmark, Stockholm (SE); Kurt Thomas Boden, Strangnas (SE); Lars-Olof Svensson, Stockholm (SE); Par Westlund, Stockholm (SE)

(73) Assignee: Marvell International Ltd., Hamilton (BM)

( * ) Notice: Subject to any disclaimer, the term of this patent is extended or adjusted under 35 U.S.C. 154(b) by 259 days.

This patent is subject to a terminal disclaimer.

(21) Appl. No.: 14/275,104

(22) Filed: May 12, 2014

(65) Prior Publication Data

US 2014/0247835 A1    Sep. 4, 2014

Related U.S. Application Data

(63) Continuation of application No. 10/510,167, filed as application No. PCT/SE03/00536 on Apr. 3, 2003, now Pat. No. 8,725,900.

(30) Foreign Application Priority Data

Apr. 4, 2002 (SE) ...................................... 0201020

(51) Int. Cl.
*H04L 12/955* (2013.01)
*H04L 12/70* (2013.01)
(Continued)

(52) U.S. Cl.
CPC .............. *H04L 69/22* (2013.01); *G06F 9/382* (2013.01); *G06F 9/3867* (2013.01); *H04L 69/324* (2013.01)

(58) Field of Classification Search
CPC ........................... H04L 49/1546; H04L 69/22
See application file for complete search history.

(56) References Cited

U.S. PATENT DOCUMENTS 4,506,358 A * 3/1985 Montgomery ...... H04L 49/1507
370/409
5,598,410 A    1/1997 Stone
(Continued)

FOREIGN PATENT DOCUMENTS

EP            0717533 A2    6/1996
WO       WO-99/60708 A2   11/1999
(Continued)

*Primary Examiner* — Scott M Sciacca

(57) ABSTRACT

A system including a receiver and a processing pipeline. The receiver is configured to generate a data block by encapsulating a data packet in a header portion and a tail portion that do not include valid information bits. The processing pipeline is configured to, in a first processing stage, store the data block, and store, separately from the data block, additional information associated with the data block. The processing pipeline is further configured to, without modifying a length of the data block, either add bits to the header portion or the tail portion to increase the length of the data packet or subtract bits from the data packet to decrease the length of the data packet, and modify the additional information in accordance with the bits added to the header portion or the tail portion or the bits subtracted from the data packet.

15 Claims, 9 Drawing Sheets

(51) Int. Cl.
*H04L 29/06* (2006.01)
*G06F 9/38* (2006.01)
*H04L 29/08* (2006.01)

(56) References Cited

U.S. PATENT DOCUMENTS

| | | | |
|---|---|---|---|
| 5,818,894 A | 10/1998 | Song | |
| 6,047,122 A | 4/2000 | Spiller | |
| 6,480,507 B1 * | 11/2002 | Mercer | H04L 29/06 370/395.7 |
| 6,976,154 B1 | 12/2005 | Dyckerhoff et al. | |
| 6,996,117 B2 | 2/2006 | Lee et al. | |
| 7,010,673 B2 | 3/2006 | Svensson et al. | |
| 7,016,351 B1 | 3/2006 | Farinacci et al. | |
| 7,069,372 B1 * | 6/2006 | Leung, Jr. | G06F 9/3802 709/238 |
| 7,397,798 B2 | 7/2008 | Svensson et al. | |
| 2002/0037011 A1 | 3/2002 | Musoll et al. | |
| 2002/0071433 A1 | 6/2002 | Tsuruoka et al. | |
| 2002/0120828 A1 | 8/2002 | Modelski et al. | |
| 2002/0122424 A1 | 9/2002 | Kawarai et al. | |
| 2003/0012198 A1 * | 1/2003 | Kaganoi | H04L 45/7453 370/392 |
| 2003/0046429 A1 | 3/2003 | Sonksen | |
| 2003/0053481 A1 * | 3/2003 | Abiru | H04L 29/06 370/465 |
| 2003/0103499 A1 * | 6/2003 | Davis | H04L 45/00 370/389 |
| 2003/0147409 A1 * | 8/2003 | Wolrich | H04L 49/90 370/412 |
| 2003/0163589 A1 * | 8/2003 | Bunce | H04L 49/1546 709/250 |
| 2003/0191866 A1 | 10/2003 | Wolrich et al. | |
| 2003/0196081 A1 | 10/2003 | Savarda et al. | |
| 2004/0133673 A1 | 7/2004 | Svensson et al. | |
| 2004/0215620 A1 | 10/2004 | Svensson et al. | |
| 2006/0039374 A1 * | 2/2006 | Belz | H04L 12/5693 370/389 |
| 2006/0117088 A1 * | 6/2006 | Petersen | H04L 69/22 709/206 |
| 2006/0206620 A1 | 9/2006 | Devanagondi et al. | |
| 2006/0242317 A1 | 10/2006 | Van Hoof et al. | |
| 2006/0251069 A1 | 11/2006 | Cathey et al. | |
| 2007/0025380 A1 | 2/2007 | Amagai et al. | |

FOREIGN PATENT DOCUMENTS

| | | |
|---|---|---|
| WO | WO-0010297 A1 | 2/2000 |
| WO | WO-02/096043 A1 | 11/2002 |
| WO | WO-03085519 A1 | 10/2003 |

\* cited by examiner 140  110  120 130 150

100

200

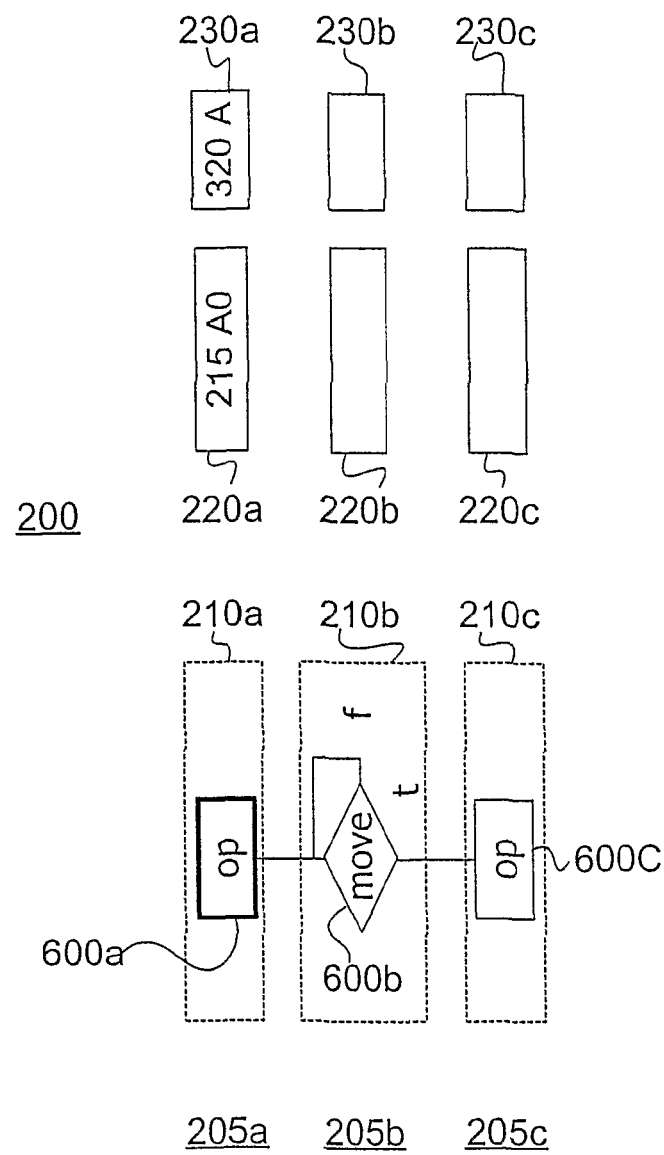

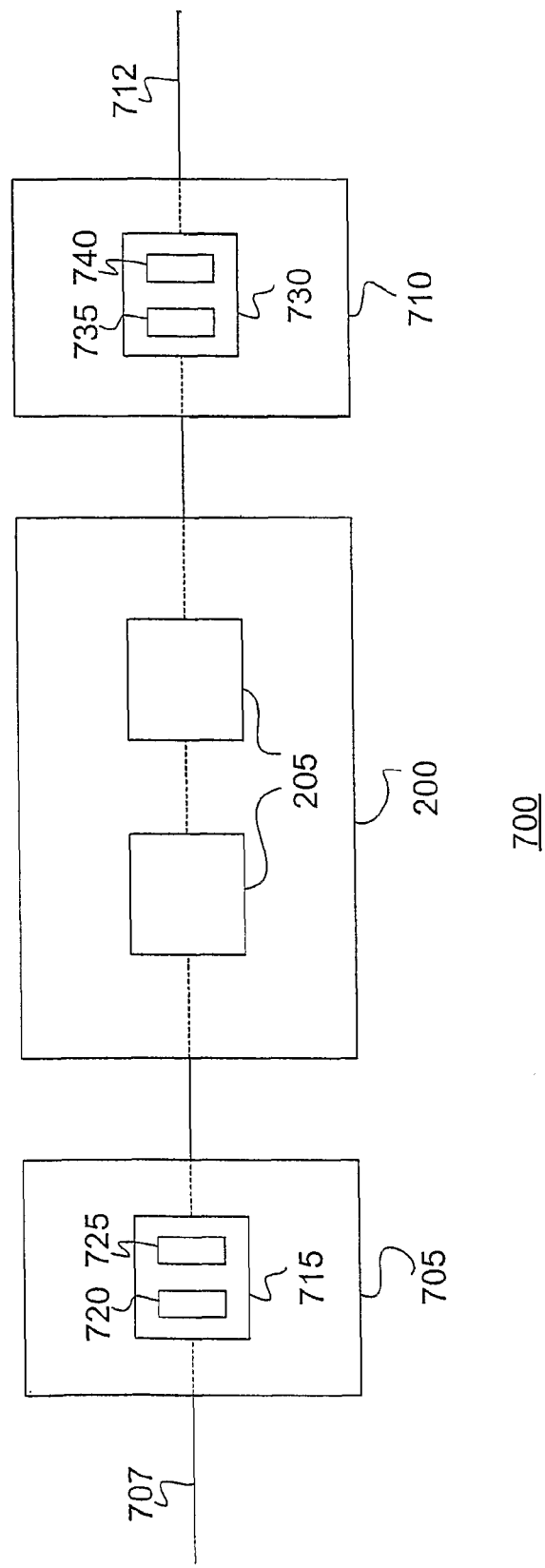

SYSTEM AND METHOD FOR MODIFYING, IN A PROCESSING PIPELINE, A LENGTH OF A DATA PACKET IN A DATA BLOCK WITHOUT MODIFYING A LENGTH OF THE DATA BLOCK

CROSS-REFERENCE TO RELATED APPLICATIONS

The present disclosure is a continuation of U.S. patent application Ser. No. 10/510,167 (now U.S. Pat. No. 8,725,900), filed on Jul. 18, 2005, which is a National Stage of International Application No. PCT/SE03/00536, filed on Apr. 3, 2003, which claims the benefit of Swedish Patent Application No. SE0201020-5, filed on Apr. 4, 2002. The entire disclosures of the applications referenced above are incorporated herein by reference.

FIELD

The present invention relates to data processing in general, and more particularly to a method and apparatus for pipelined processing of data.

BACKGROUND

Many computers process data in a pipelined process. A processor which uses a pipelined processing technique and which receives a stream of data to be operated upon by the processor can be divided into segments referred to as processing stages, each processing stage being capable of executing operations on data. The processing stages make up a pipeline. Several data packets may simultaneously be present in the processor pipeline, being operated upon by different processing stages, and being brought forward to the next processing stage in the pipeline as time flows. Each processing stage can execute operations on the data present in the processing stage. Upon each clock tick, data is passed onto the subsequent stage by loading registers that are located between the previous and the subsequent processing stages. The data thus becomes present in the subsequent stage.

SUMMARY

A problem to which the present invention relates is how to improve the possibilities of utilizing pipelined processing of data.

This problem is addressed by a method of pipelined processing of a data packet in a processing means comprising at least one processing stage. The method is characterized by associating information reference to said data packet, said information reference comprising information relating to the length and position of information contained in the data packet. The method is further characterized in that, if said data packet is processed in a processing stage in a manner so that the length and/or position of said information contained in the data packet is changed, then the information reference is altered in order to reflect said change.

The problem is further addressed by a processing means for pipelined processing of a data packet, and by an integrated circuit and a computer unit comprising said processing means.

The processing means comprises at least one processing stage comprising a logic unit and a register for storing at least part of said data packet. The processing means is characterized in that at least one register for storing information reference associated with said data packet is accessible to said logic unit, and at least one of at said at least one logic units is adapted to operate upon said information reference.

By the inventive method and processing means is achieved that the information contained in a data packet can be operated upon, by a pipelined processor, in a manner so that the length of the information contained in the data packet, and/or the position of the information in the data packet, is altered. By altering the value of the information reference accordingly upon such operations, information will always be available about the length and position of the information in the data packet.

In one embodiment of the invention, at least one bit is added to the data packet prior to associating information reference to the data packet. In this aspect of the invention, the processing means further comprises means for adding bits. Hereby is achieved that the information contained in the data packet when the data packet exits the processing means can occupy more bits than the number of bits that the data packet entering the processing means comprises. In this embodiment, the at least one bit is preferably added to the data packet in the beginning of the data packet as a dummy header, and/or at the end of the data packet as a dummy tail. Hereby is achieved that the method and processing means are made suitable for processing of data packets in a communication system in which headers and tails are added and removed from a data packet as the data packet is transmitted within the communication system. The means for adding bits could suitably comprise a buffer and a shifter. Advantageously, the shifter could be a barrel shifter. Hereby is achieved that the number of bits being added to a data packet is flexible. The number of bits being added could e.g. differ between each packet, be static, or be varied from time to time according to the desire of the operator of the processing means.

In one aspect of the invention, at least one bit is removed from the data packet upon the data packet exiting the last one of the processing stages. In this aspect of the invention, the inventive processing means further comprises means for removing at least one bit from said data packet. Hereby is achieved that the use of bandwidth is made efficient, and that bits not containing any information can be removed. Preferably it is determined, prior to the removal of bits, whether any bits of the data packet are superfluous, and if so, then said superfluous bits are removed. Hereby is achieved that the use of bandwidth is optimized. The means for removing bits could suitably comprise a shifter and buffer. Said shifter could advantageously be a barrel shifter. The barrel shifter could use the information reference to determine how the bits of the data packet should be shifted.

The information reference could preferably be included in additional information associated with said data packet. The at least one processing stage of said processing means could then comprise at least one register for storing information reference. Hereby is achieved that processing of information reference can be made fast, and, when the data packet is divided into at least two data blocks, that the information reference can slide backwards and/or forwards within the data blocks in order to be available only to the processing stage operating on either one of the data blocks.

BRIEF DESCRIPTION OF DRAWINGS

FIGS. 6a-d illustrate an embodiment of how information reference can slide backwards within a set of data blocks in a processing pipeline.

FIG. 7 illustrates processing means according to an embodiment of the invention.

DESCRIPTION

Figure 1:
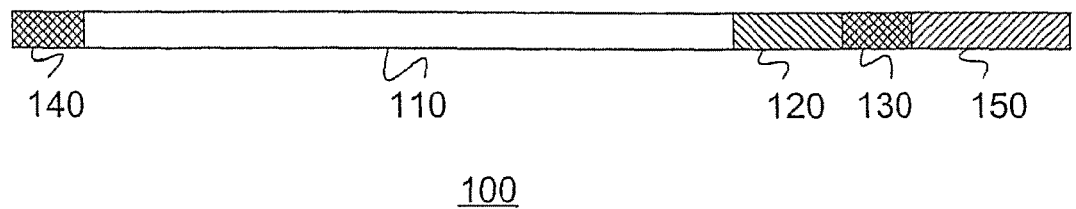
FIG. 1 shows an example of a data packet.

Most data communication systems consist of a number of nodes, in which data may be processed and between which nodes data packets are transmitted by use of several protocols. A node can use one or more protocols for the transmission of data packets. When a data packet is transmitted using a protocol, the transmitting node may add a protocol header and/or a protocol tail to the data packet in order to add information necessary to the further transmission of the data packet. Similarly, when a node receives a data packet, the receiving node may remove a protocol header and/or a protocol tail from the data packet in order to unpack the data contained in the data packet. A typical data packet 100 is shown in FIG. 1, where user data 110 is encapsulated in a header 120 added by a first protocol, a header 130 and a tail 140 added by a second protocol, and a header 150 added by a third protocol. As the data packet 100 is transmitted within the communication network, nodes will repeatedly encapsulate the data packet 100 by adding headers and/or tails, and decapsulate data packet 100 by removing headers and/or tails.

Figure 2:
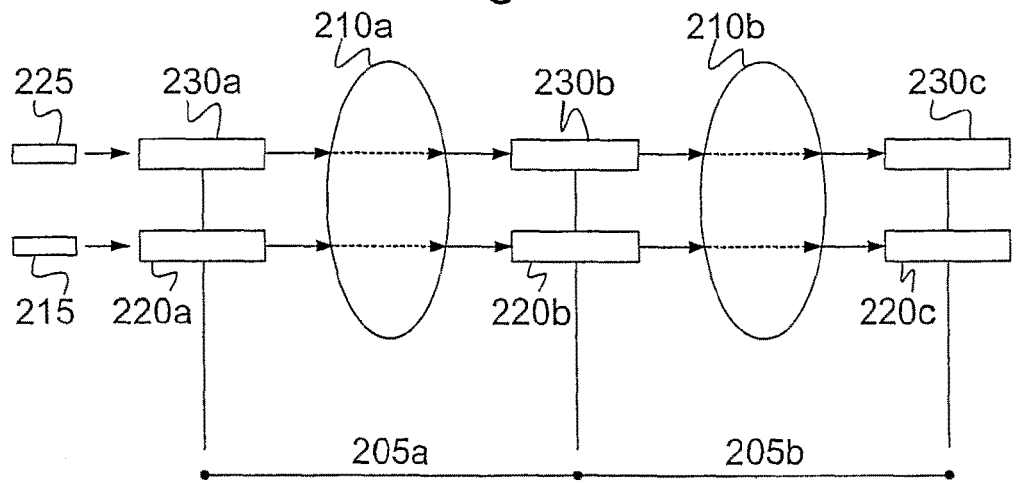
FIG. 2 is a schematic illustration of a processing pipeline comprising two processing stages.

In FIG. 2, an example of a processing pipeline 200 comprising two processing stages 205a and 205b is shown. Obviously, a pipeline 200 may comprise more than two processing stages 205. The processing stages 205a and 205b comprise logic units 210a and 210b, respectively, in which the operation on data is performed. A data block 215, comprising one or several data packets 100, or parts of a data packet 100, is stored in a data block register 220a upon entering the pipeline 200. Additional information 225 associated with data block 215, such as e.g. information about which instructions should be executed on data block 215 in pipeline 200 (see Swedish Patent Application No. 0100221-1, filed by the applicant and hereby incorporated by reference), may accompany the data block 215 and can be stored in one or more additional registers 230a. The additional information 225, as well as the data blocks 215, may or may not be operated upon in the pipeline 200. As data block 215 and additional information 225 has entered the pipeline, they will be processed by logic unit 210a. Upon a first clock tick, the data block 215 and additional information 225 will be stored in data block register 220b and additional register 230b, respectively, which registers are accessible by processing stage 205a and processing stage 205b. A second data block (not shown in the figure) may then enter register 220a, possibly accompanied by associated additional information that could enter register 230a. Upon a second clock tick, data block 215 and additional information 225 will be present in processing stage 205b, while the second data block will be present in processing stage 205a. Upon a third clock tick, data block 215 and additional information 225 will be stored in registers 220c and 230c, respectively, while the second data block will be stored in data block register 220b. A third data block 215 may now enter the pipeline, to be stored in data block register 220a.

A register for storing data, such as registers 220 and 230, can only store up to a predetermined maximum of data bits, and a processing stage 205 can only process a predetermined amount of data bits at a time. When adjusting the flow of data through pipeline 200, these limits of the registers 220, 230 and the processing stages 205 would have to be considered. A further consequence hereof is that in a pipelined processing environment, to add bits from the data present in a pipeline 200 would cause huge problems in terms of e.g. interference with preceding and/or following data blocks 215. Therefore, designing pipelined processors or ASICs to be used in systems in which bits are added and or removed by the processors, such as e.g. data communication systems where headers and/or tails are regularly added to, and removed from, data packets, is not a straightforward process. In order to allow for changing the size of data packets within the pipeline 200, complex logic for dynamically shifting data at any stage of pipeline 200 would be required, as well as some flexible queuing of data blocks 215.

A solution to the problem of how to be able to vary the number of bits of a data packet 100 that is processed in a pipeline 200 is to add dummy bits to the data packet 100, prior to the data packet 100 entering the pipeline 200. Variable(s) for recording the length of the data packet 100 (i.e. the number of bits contained in data packet 100), and the position of the first bit of data packet 100, could then be associated with data packet 100. As data packet 100 is operated upon and the length and position of the information contained in data packet 100 is altered, these variable(s) of recording could be altered accordingly.

In the following, it will be assumed that the number of bits added to a data packet 100 is a multiple of eight, i.e. the added bits can easily be formed into bytes. However, any number of bits could be added to a data packet 100.

Figure 3:
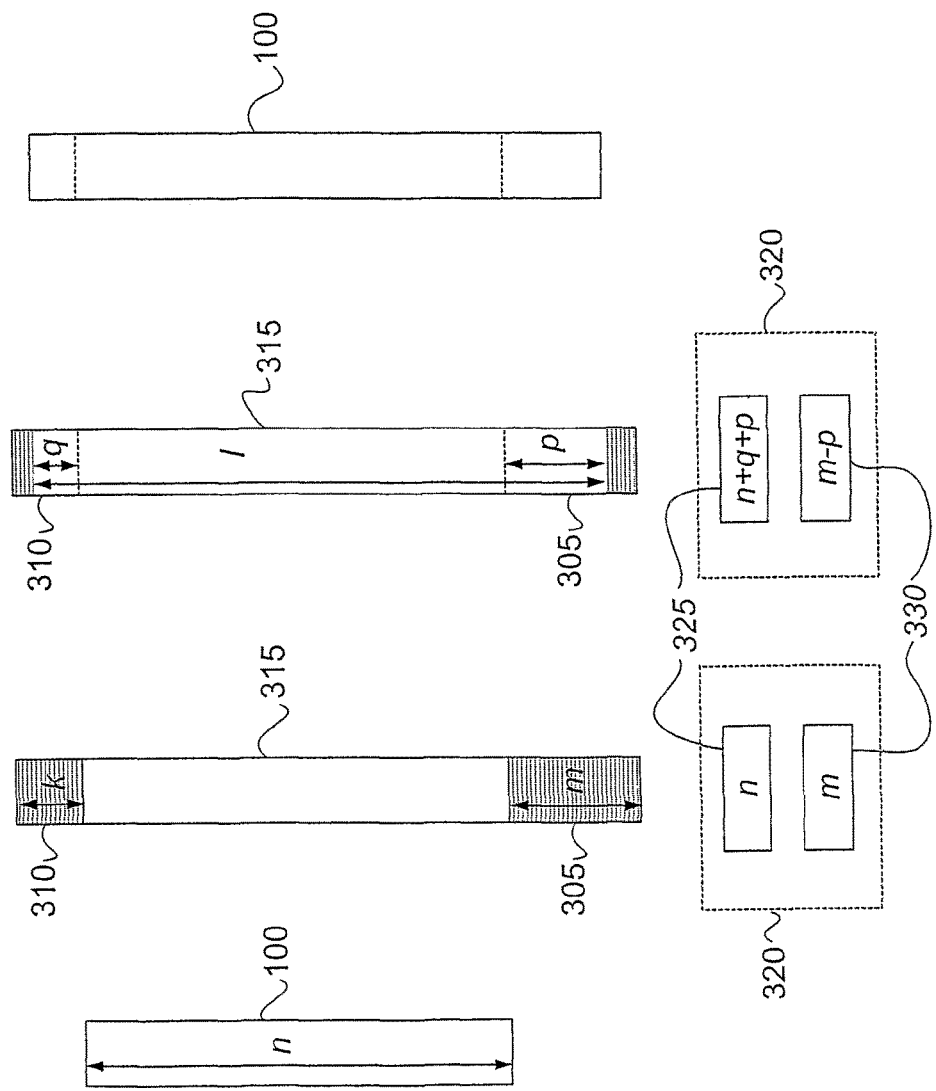
FIGS. 3a-d illustrate how a data packet is operated upon according to an embodiment of the invention.

FIG. 3 schematically illustrates a received data packet 100 being encapsulated according to an embodiment of the inventive method. In FIG. 3a, a received data packet 100 comprising 77 bytes is shown. In FIG. 3b, a dummy header comprising m bytes is added to the received data packet 100, as well as a dummy tail 310 comprising k bytes, the received data packet 100, the dummy header 305 and the dummy tail 310 making up an intermediate packet 315. The shaded color of dummy header 305 and dummy tail 310 indicates that the bytes contained therein do, not represent any information, i.e. dummy header 305 and dummy tail 310 are empty. Additional information 225 comprising information about the length of the information contained in intermediate packet 315, as well as about the position of the information contained in the intermediate packet 315, hereinafter referred to as information reference 320, could then be associated with intermediate packet 315. When intermediate packet 315 is first generated, information reference 320 should preferably contain information about the length of the received data packet 100, as well as information about the position of received data packet 100 within intermediate packet 315. In FIG. 3, such information reference 320 is illustrated by a length value 325, indicating the length of the part of the intermediate packet 315 that contains information, and an offset value 330, indicating the position of the first byte of intermediate packet 315 that contains information. The length value 325 and the offset value 315 could preferably be stored in different additional registers 230. In FIG. 3b, the length value 325 takes the value n, while offset value 330 takes the value m. In other implementations, such information reference 320 could comprise information representing the position of the first byte of information and the last byte of information in intermediate packet 315, or information representing the length of the information contained in intermediate packet 315 and the position of the last byte of information.

FIG. 3c illustrates that the intermediate packet 315 has been executed upon by one or several of the logic units 210 in pipeline 200. Parts of the dummy header 305 and the dummy tail 310 of the intermediate packet 315 of FIG. 3c are used to represent information, so that the size of the data containing information is increased from n bytes to l bytes, where 1≤n+m+k. In the example given in FIG. 3c, p bytes of dummy header 305 and q bytes of dummy tail 310 are used for information. This is illustrated by the shaded area of intermediate packet 315 being smaller than the shaded area of intermediate packet 315 shown in FIG. 3b, a shaded area representing empty bytes. Accordingly, the value of length value 325 of FIG. 3c is n+p+q, while the value of the offset value 330 is m−p. An example of an operation that would result in this scenario could be the encapsulation of a data packet 100 by a transmitting node in a data communication system by adding a header and a tail comprising information relevant to the following transmission of the data packet 100. Another example could be a local subsystem, used for transmission of data to another local subsystem within the same node, encapsulating data according to a local subsystem protocol. Yet another example is the encapsulation of data according to a local hardware protocol, used for the transmission of data between hardware components on a hardware board, or between hardware boards.

In FIG. 3d, the bytes that are still not representing any information has been removed, yielding a resulting data packet 100 comprising more bytes than the received data packet 100. Assuming that no operation that has resulted in changes of the length of the information stored in the intermediate packet 315 has been performed, other than the changes indicated in FIG. 3b, the amount of bytes to be removed is m−p at the header end of intermediate packet 315, and k−q at the tail end of the intermediate packet 315. Alternatively, some or all of the bytes in intermediate packet 315 that are empty could be kept as part of resulting data packet 100. The removal of the superfluous bytes of intermediate packet 315 could advantageously be performed after the packet has exited the pipeline 200. Alternatively, the removal could be performed at the end of the pipeline 200.

Naturally, rather than using only some of the bytes in the dummy header 305 and the dummy tail 310, all bytes of dummy header 305 and dummy tail 310 could be used for the representation of information. There would then be no superfluous bytes to remove, and the resulting data packet 100 would be the same as the intermediate packet 315 that exits the last processing stage of pipeline 200. A scenario could also occur where bytes from only one of the dummy header 305 or the dummy tail 310 have been used for representing information when the intermediate packet 315 leaves the pipeline 200. In some instances, it may occur that none of the bytes in dummy header 305 or dummy tail 310 are used for representing information. The inventive method could advantageously be used also for a situation where the resulting data packet 100 contains less information than the received data packet 100. Obviously, any combination of adding/removing information at the header/tail end of the received data packet 100 can be performed by the inventive method.

Figure 4:
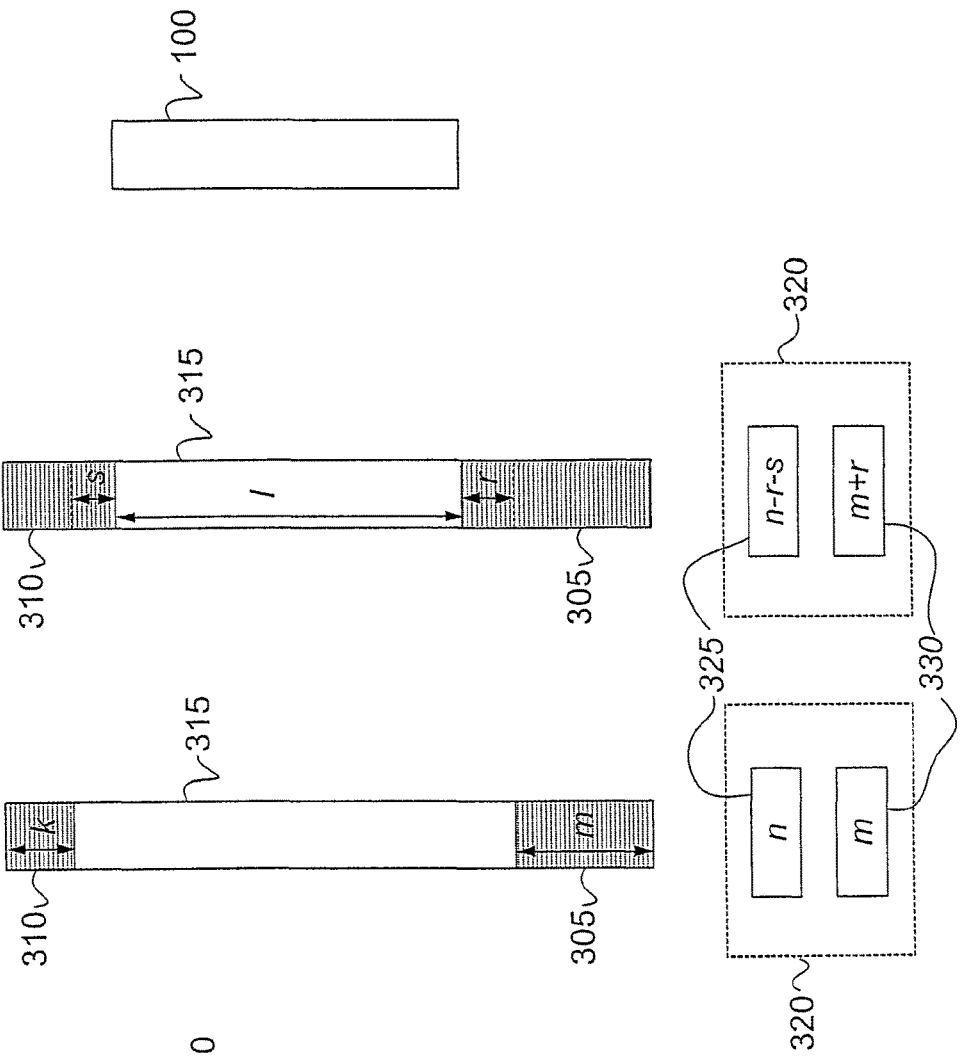
FIGS. 4a-d illustrate how a data packet is operated upon according to another embodiment of the invention.

The decapsulation of a received data packet 100 according to an embodiment of the present invention is illustrated in FIG. 4. FIG. 4a shows a received data packet 100 comprising n bytes of information. FIG. 4b corresponds to FIG. 3b, where a dummy header 305 containing m bytes and a dummy tail 310 comprising k bytes are added to the received data packet 100, resulting in an intermediate packet 315. FIG. 4c illustrates that the intermediate packet 315 has been operated upon by at least one of the logic units 210 of pipeline 200. Not all of the information contained in the received data packet 100 is still useful, and the amount of bytes representing empty information has increased compared to the intermediate packet 315 that was initially generated. In the example given in FIG. 4c, the length of the information contained in intermediate packet 315 has been reduced by r bytes at the header end of the intermediate packet 315, and by s bytes at the tail end. The values of the length value 325 and the offset value 330 have accordingly been changed into n−r−s and m+r, respectively. An example of an operation that would result in this scenario is the unpacking of a data packet 100 by a receiving node in a communications system, where header(s) and/or tail(s) comprising information that was relevant only at previous stages of the transmission session are removed.

In FIG. 4d, the superfluous bytes of the intermediate packet 315 that exits the last processing stage 215 of pipeline 200 have been removed, resulting in a resulting data packet 100 comprising less bytes than received data packet 100.

In an embodiment of the invention where all data packets 100 processed by a pipeline 200 are decapsulated rather than encapsulated, so that the size of a received data packet 100 is always greater than the corresponding resulting data packet 100, the addition of bytes to the received data packet 100, illustrated by FIGS. 3b and 4b, could be omitted. However, the information reference 320, also illustrated by FIGS. 3b and 4b, should preferably be generated even in such an embodiment.

The step illustrated by FIGS. 3b and 4b could advantageously be performed prior to the received data packet 100 entering the pipeline 200, while the step illustrated by FIGS. 3d and 4d could advantageously be performed after the intermediate packet 315 has exited the pipeline 200.

The number of bytes added to a received data packet 100 in order to form an intermediate packet 315 can vary from time to time. Each data packet 100 to be processed by a pipeline 200 could e.g. be associated with information about how many bytes should be added to the received data packet 100.

Figure 5:
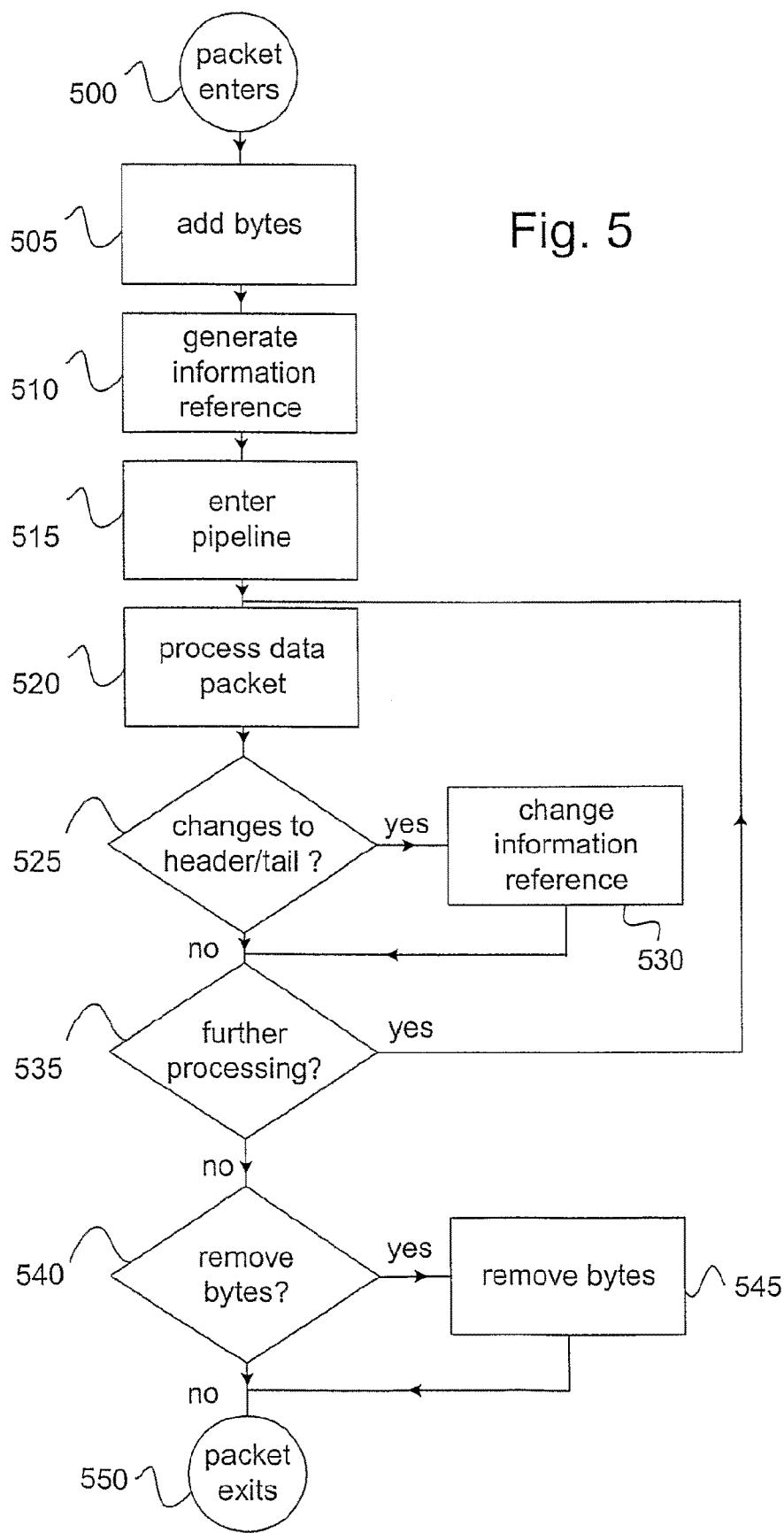
FIG. 5 is a flowchart, schematically illustrating an embodiment of the inventive method.

A flowchart describing en embodiment of the inventive method is schematically illustrated in FIG. 5. In step 500, a data packet 100 to be processed in a pipeline 200 enters the pipeline receiver, which could e.g. be positioned before the registers 220a and 230a of FIG. 2. In step 505, an intermediate packet 315 is created by increasing the size of received data packet 100 via adding to received data packet 100 additional bytes, either in form of a dummy header 305, a dummy tail 310, or both. In step 510, information reference 320 is created and associated with intermediate packet 315. Preferably, this information reference 320 is part of the additional information 225. The information reference 320 could e.g. be realised by a length value 325 and an offset value 330, cf. FIGS. 3 and 4. Length value 325 and offset value 330 could preferably be stored in separate additional registers 230. In step 515, the intermediate packet 315 and the additional information 225 enter the pipeline 200, so that at least part of intermediate packet 315 and the additional information 325 is available for at least one of the processing stages 205 of pipeline 200. In step 520, at least one processing stage of 205 processes at least part of intermediate packet 315. In step 525, it is checked whether any operation performed on intermediate packet 315 in step 525 results in that information reference 320 should be changed. If so, step 530 is entered, where the information reference 320 is changed accordingly. Then step 535 is entered. If in step 525 it is found that no changes to the information reference 320 is necessary, then step 535 is entered directly. In step 535 it is checked whether any further processing of intermediate packet 315 will take place, i.e. if there will be any parts of intermediate packet 315 present in any of the processing stages 205 upon the next clock. If so, then step 520 is re-entered, so that for each clock tick upon which at least part of the intermediate packet 315 is available for processing by at least one of the processing stages 205, the loop made up of step 520, 525, 535 and, where applicable, step 530, is run. If it is found in step 535 that no more processing of intermediate packet 315 will take place in pipeline 200, then step 540 is entered, in which step it is checked whether any bytes should be removed from intermediate packet 315. This could preferably be performed by way of checking the value of information reference 320. If any bytes should be removed from intermediate packet 315, then step 545 is entered, in which superfluous bytes at the header end and/or the tail end of intermediate packet 315 is removed according to the value of information reference 320. Step 550, where the data packet 100 exits the pipeline, is then entered. If in step 540 it is found that no superfluous bytes should be removed, then step 550 is entered directly.

The flowchart of FIG. 5 could be altered in many ways without departing from the spirit of the invention. For example, step 540 in which it is checked whether any bytes should be removed from of intermediate packet 315 could be omitted, and step 545 entered directly after step 535. Alternatively, steps 540 and 545 could be omitted, data packet 100 exiting the pipeline in step 550 then including any superfluous bytes. Furthermore, step 525 could e.g. be implemented so that the program executing on intermediate packet 315 in step 520 also executes changes to the information reference 320, in conjunction with executing the changes of intermediate packet 315 giving rise to the need of changing the length value 325 and offset value 330. Step 525 could then be omitted. Alternatively, a flag could be set in step 520, indicating whether or not the length and position of the information contained in intermediate packet 315 has been changed, and step 525 would then comprise checking the value of said flag. As discussed above in relation to FIGS. 3 and 4, the step 505 could advantageously be omitted in embodiments of the invention in which all received data packets 100 will be decapsulated by pipeline 200.

Depending of the size of a received data packet 100 and the bandwidth of pipeline 200, the received data packet 100 may have to be divided into two or more data blocks 215. The size of a data block 215 is a question of implementation, and any size of data block 215 could be used. In one embodiment of the application, given by way of example, the size of a data block 215 is 64 bytes. A received data packet 100 containing 150 bytes of information would in this embodiment be divided into at least 3 blocks of 64 bytes each, making up an intermediate packet 315. In the case of 150 bytes being divided upon 3 data blocks of 64 bytes each, the intermediate packet 315 contains 192 bytes, of which 42 bytes can be distributed amongst a dummy header 305 and/or a dummy tail 310. If more extra bytes are desired, additional, empty, blocks could optionally be added to the intermediate packet 315, yielding a larger dummy header 305 and/or dummy tail 310. Alternatively, additional bytes can be added to received data packet 100, in order to form an intermediate packet 315, before the intermediate packet 315 is divided into data blocks 215.

When an intermediate packet 315 is divided into data blocks 215 and each data block 215 is operated upon separately by the processing stages 205 of pipeline 200, only one information reference 320 should preferably be associated with the group of data blocks 215 representing the intermediate packet 315. When an intermediate packet 315 enters a pipeline 200, the information reference 320 should preferably enter the pipeline together with the data block 215 that enters the pipeline 200 first (cf. additional information 225 accompanying data block 215 in FIG. 2). As other data blocks 215 enter the pipeline 200, operations that give rise to the necessity of altering the information reference 320 may be performed on any data block 215 of intermediate packet 315 present in any of the processing stages 205 of pipeline 200. Hence, the information reference 320 should advantageously be available to the logic unit 210 of the processing stage 205 in which such operations are performed, at the time of the operations being performed, in order to provide for the possibility of keeping the information reference 320 up to date at all times.

FIGS. 6a-d illustrate the flow of an intermediate packet 315 A through a pipeline 200 according to an embodiment of the invention. The intermediate packet 315 A is divided into two data blocks 215, referred to as data blocks 215 A0 and 215 A1, and accompanied by information reference 320 A. Intermediate packet 315 A may comprise a dummy header 305 and/or a dummy tail 310. Additional information 225 other than information reference 320 may accompany intermediate packet 315A, or each individual data block 215 A0-A1, but to simplify the description, this other additional information 225 is not illustrated in FIG. 6.

The pipeline 200 of FIGS. 6a-d consists of three processing stages 205a-c, each comprising a logic unit 210, referred to as logic unit 210a-c, respectively. It should be understood that pipeline 200 may comprise any number of processing stages 205. To a logic unit 210a-c, one or more operations for operating on data blocks 215 are available, as is illustrated by each logic unit 210 in the FIGS. 6a-d containing a sequence 600a-c of a flow diagram. To simplify the description, only one operation is available to each logic unit 210 of FIG. 6, although it should be understood that more complicated structures of operations may be implemented.

As time flows, each data block 215 proceeds through the pipeline 200, so that each data block 215 is available for processing in each logic unit 210 during a period of time corresponding to the time that passes between two consecutive clock ticks. Each processing stage 205 of FIG. 6 comprises a data block register 220 and an additional register 230. During the time when a certain data block 215 is available to a certain logic unit 210, logic unit 210 may or may not operate on the data block 215. If the logic unit 210 operates on data block 215, the additional information 225, such as information reference 320, associated with the intermediate packet 315 which data block 215 is a part of, should preferably be available for processing by the logic unit 215.

Figure 6B:
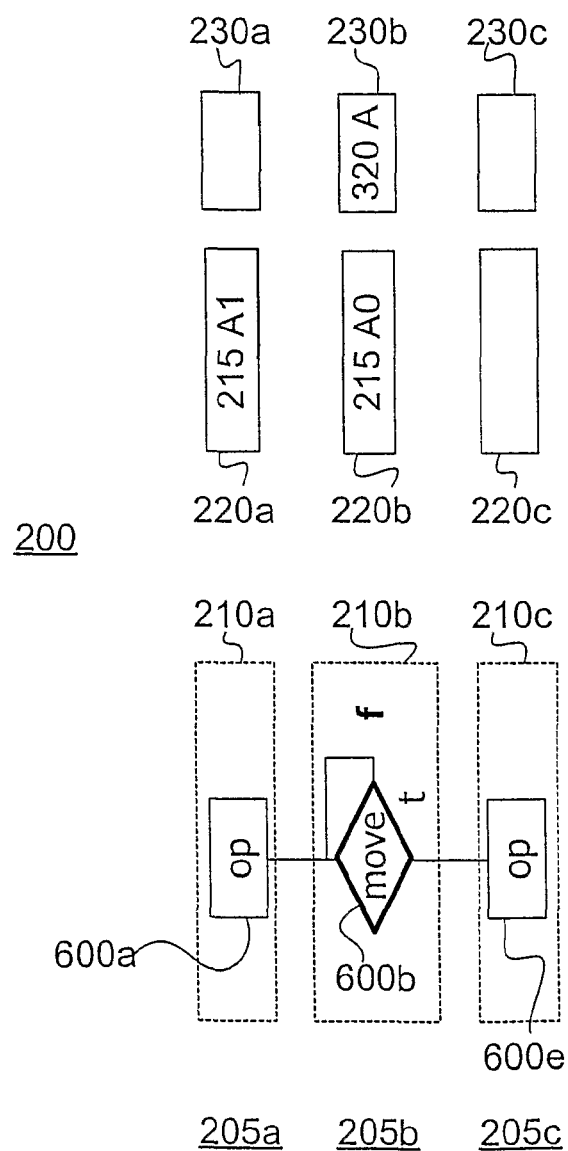

FIGS. 6a-d each illustrate a separate period of time, each period of time corresponding to the time interval that passes between two consecutive clock tick ticks. FIG. 6a illustrates a first clock tick in which the first data block 215 A0 of intermediate packet 315A has entered the first processing stage 205a of pipeline 200. Information reference 320A has also entered processing stage 205a, and data block 215 A0 and information reference 320A are stored in data block register 220a and additional register 230a, respectively. As illustrated by the bold line around sequence 600a, logic unit 205a operates on data block 215 A0 during this clock tick. If the length of the information contained in intermediate packet 315, or the position of said information, are affected by the operation performed on data block 215 A0, then logic unit 210a operates on information reference 320A in order for information reference 320 A to reflect these changes.

In FIG. 6b, a second clock tick is illustrated, in which data block 215 A0 and information reference 320A have been forwarded to processing stage 210b. Data block 215 A1 has entered processing stage 210a. Since data block 215 A2 is not accompanied by any information reference 320 at this point in time, additional register 230a is empty (or contains non-useful information). Logic unit 210b operates on data block 215 A0, as is indicated by the bold line around sequence 600b. Logic unit 210a, on the other hand, does not operate on data block 215 A1. By the operation performed on data block 215 A0 by logic unit 210b, it is determined whether information reference 320A should be moved forward to additional register 230c during the next clock tick. As is illustrated by the "false" way out of sequence 600b being bold, it is determined that information reference 320A should not be moved forward, but it should rather slide backwards within the set of data blocks 215 making up intermediate packet 315. This indicates that during the next clock tick, data block 215 A1 will be operated upon, rather than data block 215 A0.

Figure 6C:
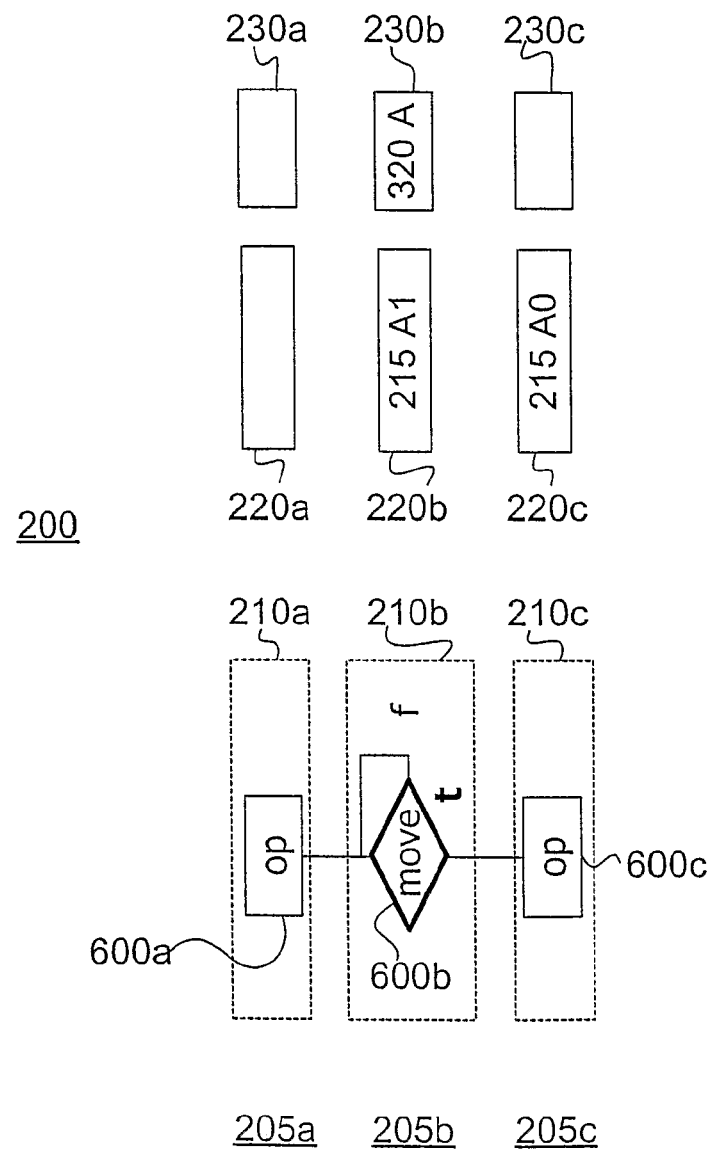

In accordance with the operation illustrated in FIG. 6b, FIG. 6c, illustrating a third clock tick, shows a situation where data blocks 215 A0 and 215 A1 are each moved forward to the next processing stages 205c and 205b, respectively, while information reference 320A remains in additional register 230b. Data block 215 A2 has entered processing stage 205 a. During the clock tick illustrated by FIG. 6c, logic unit 210b operates on data block 215 A1 in order to determine whether information reference 320b should move forward to processing stage 205c during the next clock tick. As is illustrated in the figure (the "t" of sequence 600b being bold), the result of the operation is that information reference 320b should be moved forward to processing stage 205c during next clock tick.

Figure 6D:
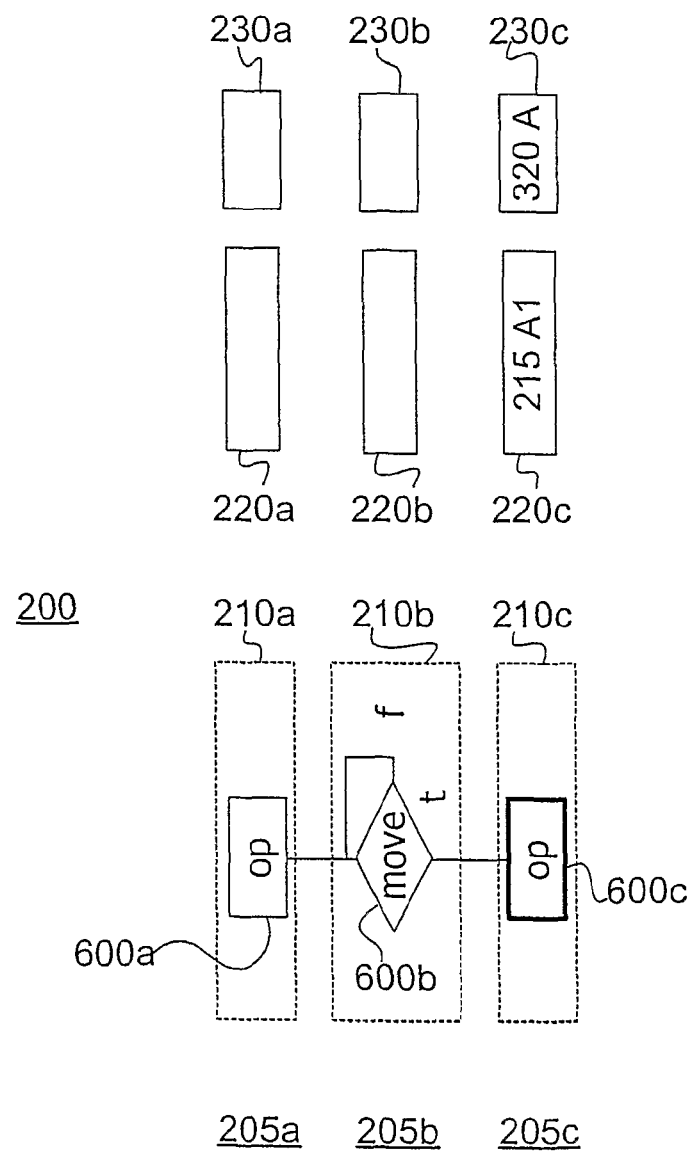

In FIG. 6d, a fourth clock tick is illustrated, in which data block 215 A0 has left pipeline 200 and data block 215 A1 and information reference 320A are stored in data block register 220c and additional register 230c, respectively. As is indicated by the bold line around sequence 600c, logic unit 210c performs an operation on data block 215 A1 during this clock tick. Should the operation performed on data block 215 A1 by logic unit 210c have altered the length or the position of the information contained in intermediate packet 315, then the information reference 320A is altered accordingly.

The process of sliding the information reference 320 backwards within the set of data blocks 215 that make up intermediate packet 315 is very efficient for providing the information reference 320 to a processing stage 205 that is positioned closer to the input of pipeline 200 than the processing stage 205 that last processed the additional information 320. However, in some cases, it might be necessary to slide the information reference 320 forwards within the set of data blocks 215, so that the information reference 320 can be operated upon by a processing stage 205 which is further away from the input of pipeline 200 than the processing stage 205 that last operated upon information reference 320. One way of sliding the information reference 320 forwards is to have synchronization buffers at different points in pipeline 200. To slide the information reference 320 forwards can e.g. be interesting when the intermediate packet 315 exits pipeline 200, in order to allow for the first byte of intermediate packet 315 to be accompanied by the information reference 320. A synchronization buffer could then be positioned after the last processing stage 205 of pipeline 200.

The process of sliding additional information 225 backwards and forwards in the set of data blocks 215 forming an intermediate packet 315 is further described in the International patent application PCT/SE01/01133, filed by the applicant and hereby incorporated by reference.

As an alternative to implementing information reference 320 as part of additional information 225, information reference 320 could be stored in a separate memory available to all processing stages 205.

In FIG. 7, an example of a processing means 700 adapted to process data packets according to the inventive method is shown. Processing means 700 of FIG. 7 comprises a receiver 705, a pipeline 200 and a transmitter 710. The input of receiver 705 is connected to incoming line 707, and the output of receiver 705 is connected to pipeline 200. The pipeline 200 comprises a number of processing stages 205, cf. FIGS. 2 and 6, and is further connected to the input of transmitter 710, the transmitter 710 being further connected, on its output side, to outgoing line 712. The incoming line 707, the pipeline 200 and the outgoing line 712 may each have different effective bandwidths, i.e. the speed at which data may be transmitted may differ between incoming line 707, pipeline 200 and outgoing line 712. The effective bandwidth of inventive pipeline 200 is greater than or equal to the effective bandwidths of incoming line 707 and outgoing line 712.

The receiver 705 is adapted to receive data packets 100 that are to be processed in pipeline 200. Receiver 705 comprises means 715 for adding bits to received data packets 100. Thus, intermediate packets 315 are generated in receiver 705. The means 715 for adding bits could e.g. comprise a receiver buffer 720 in which the bits of data packet 100 are stored upon reception, and a receiver shifter 725, to which the bits are forwarded from the receiver buffer 720. Receiver buffer 720, which is preferably a FIFO (First In First Out) buffer, provides for the transition between the effective bandwidth of incoming line 707 and the effective bandwidth of pipeline 200. In receiver shifter 725, the bits are shifted according to how many dummy bits are desired in the dummy header 305 and the dummy tail 310 of intermediate packet 315, and the desired amount of additional bits are added. Preferably, receiver shifter 725 could be a barrel shifter in which the shift performed by receiver shifter 725 can be varied. Alternatively, receiver shifter 725 could be a static shifter.

The transmitter 710 is adapted to transmit resulting data packets 100. Preferably, transmitter 710 comprises means 730 for removing bits from intermediate packets 315. The means 730 for removing bits could e.g. comprise a transmitter shifter 735 and a transmitter buffer 740. In transceiver shifter 725, the bits are shifted according to how many dummy bits should be removed in the dummy header 305 and the dummy tail 310 of intermediate packet 315, and the superfluous bits are removed. Transmitter shifter 735 could advantageously be a barrel shifter, which could use the information of information reference 320 as input. Alternatively, transmitter shifter 735 could be a static shifter. Transmitter buffer 740, which preferably could be a FIFO buffer, provides for the transition between the effective bandwidth of pipeline 200 and the effective bandwidth of outgoing line 712.

In an embodiment of the inventive processing means that is to be used in an environment where the effective bandwidth of the pipeline 200 corresponds to the effective bandwidth of incoming line 707 plus the flow of additional bits added by means 715 for adding bits, then receiver buffer 720 could be omitted from processing means 700. Similarly, if the effective bandwidth of outgoing line 712 corresponds to the effective bandwidth of pipeline 200 minus the flow of the bits that are removed means 730 for removing bits, then the transmitter buffer 740 could be omitted.

When dimensioning the receiver buffer 720, the relation between the effective bandwidths of incoming line 707 and pipeline 200 should be considered. The expected flow of data packets 100 on incoming line 707 could also be taken into account, as well as the expected size of the data packets 100. In an embodiment of the invention in which the amount of bits added by means 715 for adding bits can be varied on a data packet basis, the receiver buffer 720 could cater for storage of data packets 100 that demand an addition of bits, which, if a continuous stream of data packets 100 demanding the addition of that same amount of bits, would correspond to a higher effective bandwidth than the effective bandwidth of pipeline 200, provided that the average amount of bits added to incoming data packets 100 does not yield a data flow that exceeds the effective bandwidth of pipeline 200. In a similar manner, when dimensioning the transmitter buffer 745, the relation between the effective bandwidths of pipeline 200 and outgoing line 712 should be accounted for.

The processing means 700 could be implemented as an integrated circuit (i.e. as an ASIC), as part of an integrated circuit, or as many integrated circuits connected to each other.

The present invention could advantageously be implemented in any node in a data communication system, in which node data packets are processed so that the length or position of information contained in data packets are altered. Examples of such nodes are routers and telecommunication switches for packet data. A processing means 700 could then be part of a computer unit, such as a network computer unit or a signal processing computer unit.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

What is claimed is:

1. A system, comprising:
   a processor including a processing pipeline; and
   a receiver configured to (i) receive a data packet having a length of n bits and (ii) prior to the data packet entering the processing pipeline, generate a data block by encapsulating the data packet with a header portion having a length of m bits and a tail portion having a length of k bits, wherein the header portion and the tail portion do not include valid information bits, and wherein the data block has a length of at least n +m +k bits,
   wherein the processing pipeline is configured to receive, from the receiver, the data block including the data packet, the header portion, and the tail portion, the processing pipeline further configured to
   in a first processing stage, (i) store the data block, (ii) store, separately from the data block, additional information associated with the data block, wherein the additional information indicates (a) the length of n bits of the data packet within the data block of n +m +k bits, and (b) a position of the n bits of the data packet within the n +m +k bits of the data block with respect to at least one of the header portion and the tail portion, and (iii) without modifying a length of the data block,
      either (a) add bits to the header portion or the tail portion to increase the length of the data packet, or
      (b) subtract bits from the data packet to decrease the length of the data packet, and
   modify the additional information in accordance with (a) the bits added to the header portion or the tail portion or (b) the bits subtracted from the data packet.

2. The system of claim 1, wherein the processing pipeline is further configured to, in a second processing stage subsequent to the first processing stage:
   if the bits were added to the header portion or the tail portion, selectively remove, based on the modified additional information, portions of the header portion or the tail portion that do not include the added bits; and
   if the bits were subtracted from the data packet, selectively remove, based on the modified additional information, the header portion, the tail portion, and the portions of the data packet that correspond to the subtracted bits.

3. The system of claim 2, wherein the additional information includes an indication of a starting position and an indication of an ending position of the data packet within the data block.

4. The system of claim 2, wherein the position of the data packet within the data block with respect to the header portion and the tail portion includes (i) an offset value indicating an offset of a first byte of the data packet and/or (ii) an offset value indicating an offset of a last byte of the data packet.

5. A system, comprising:
   a processor including a processing pipeline;
   a receiver configured to (i) receive a data packet and (ii) prior to the data packet entering the processing pipeline, generate a data block by encapsulating the data packet with a header portion and a tail portion, wherein the header portion and the tail portion do not include valid information bits,
   wherein the processing pipeline is configured to receive, from the receiver, the data block including the data packet, the header portion, and the tail portion, the processing pipeline further configured to
   in a first processing stage, (i) store the data block, (ii) store, separately from the data block, additional information associated with the data block, wherein the additional information indicates (a) a length of the data packet within the data block, and (b) a position of the data packet within the data block with respect to at least one of the header portion and the tail portion, and (iii) without modifying a length of the data block,
      either (a) add bits to the header portion or the tail portion to increase the length of the data packet, or
      (b) subtract bits from the data packet to decrease the length of the data packet, and modify the additional information in accordance with (a) the bits added to the header portion or the tail portion or (b) the bits subtracted from the data packet, wherein the processing pipeline is further configured to, in a second processing stage subsequent to the first processing stage, if the bits were added to the header portion or the tail portion, selectively remove, based on the modified additional information, portions of the header portion or the tail portion that do not include the added bits, and if the bits were subtracted from the data packet, selectively remove, based on the modified additional information, the header portion, the tail portion, and the portions of the data packet that correspond to the subtracted bits; and a register configured to store (i) the length of the data packet as a length n and ii) a position of the data packet within the data block with respect to the header portion and the tail portion as an offset m, wherein m corresponds to a length of the header portion, wherein the register is configured to modify the additional information in accordance with the bits added to the header portion or the tail portion, store the length of the data packet as a length n +q +p, wherein q corresponds to a length of bits added to the tail portion and p corresponds to a length of bits added to the header portion, and store the position of the data packet within the data block with respect to the header portion and the tail portion as an offset m −p.

6. The system of claim 5, wherein, to selectively remove portions of the header portion and the tail portion that do not include the bits added to the header portion or the tail portion, the processing pipeline is further configured to, in the second processing stage, (i) remove a number of bits from the header portion corresponding to m −p, and ii) remove a number of bits from the tail portion corresponding to k −q, wherein k corresponds to a length of the tail portion.

7. A system, comprising:
a processor including a processing pipeline;
a receiver configured to (i) receive a data packet and (ii) prior to the data packet entering the processing pipeline, generate a data block by encapsulating the data packet with a header portion and a tail portion, wherein the header portion and the tail portion do not include valid information bits, wherein the processing pipeline is configured to receive, from the receiver, the data block including the data packet, the header portion, and the tail portion, the processing pipeline further configured to in a first processing stage, (i) store the data block, (ii) store, separately from the data block, additional information associated with the data block, wherein the additional information indicates (a) a length of the data packet within the data block, and (b) a position of the data packet within the data block with respect to at least one of the header portion and the tail portion, and (iii) without modifying a length of the data block, either (a) add bits to the header portion or the tail portion to increase the length of the data packet, or (b) subtract bits from the data packet to decrease the length of the data packet, and modify the additional information in accordance with (a) the bits added to the header portion or the tail portion or (b) the bits subtracted from the data packet, wherein the processing pipeline is further configured to, in a second processing stage subsequent to the first processing stage, if the bits were added to the header portion or the tail portion, selectively remove, based on the modified additional information, portions of the header portion or the tail portion that do not include the added bits, and if the bits were subtracted from the data packet, selectively remove, based on the modified additional information, the header portion, the tail portion, and the portions of the data packet that correspond to the subtracted bits; and a register configured to store (i) the length of the data packet as a length n and ii) a position of the data packet within the data block with respect to the header portion and the tail portion as an offset in, wherein in corresponds to a length of the header portion, wherein the register is configured to, to modify the additional information in accordance with the subtracted bits, store the length of the data packet as a length n −r −s, wherein r corresponds to a number of bits subtracted from the data packet at a header end of the data packet and s corresponds to a number of bits subtracted from the data packet at a tail end of the data packet, and store the position of the data packet within the data block with respect to the header portion and the tail portion as an offset m +r.

8. The system of claim 7, wherein, to selectively remove the header portion, the tail portion, and the portions of the data packet that correspond to the subtracted bits, the processing pipeline is further configured to, using the second processing stage, i) remove a number of bits from the header portion and the header end of the data packet corresponding to m +r, and ii) remove a number of bits from the tail portion and the tail end of the data packet corresponding to k +s, wherein k corresponds to a length of the tail portion.

9. A method, comprising:
prior to a data packet having a length of n bits entering a processing pipeline, generating a data block by encapsulating the data packet with a header portion having a length of m bits and a tail portion having a length of k bits, wherein the header portion and the tail portion do not include valid information bits, and wherein the data block has a length of at least n +m +k bits;

receiving, in the processing pipeline, the data block including the data packet, the header portion, and the tail portion; and in a first processing stage of the processing pipeline, (i) storing the data block, (ii) storing, separately from the data block, additional information associated with the data block, wherein the additional information indicates (a) the length of n bits of the data packet within the data block of n +m +k bits, and (b) a position of the n bits of the data packet within the n +m +k bits of the data data block with respect to at least one of the header portion and the tail portion, and (iii) without modifying a length of the data block, either (a) adding bits to the header portion or the tail portion to increase the length of the data packet, or (b) subtracting bits from the data packet to decrease the length of the data packet, and modifying the additional information in accordance with (a) the bits added to the header portion or the tail portion or (b) the bits subtracted from the data packet.

10. The method of claim 9, further comprising, in a second processing stage subsequent to the first processing stage:
   if the bits were added to the header portion or the tail portion, selectively removing, based on the modified additional information, portions of the header portion or the tail portion that do not include the added bits; and
   if the bits were subtracted from the data packet, selectively removing, based on the modified additional information, the header portion, the tail portion, and the portions of the data packet that correspond to the subtracted bits.

11. The method of claim 10, wherein the additional information includes an indication of a starting position and an indication of an ending position of the data packet within the data block.

12. The method of claim 10, wherein the position of the data packet within the data block with respect to the header portion and the tail portion includes (i) an offset value indicating an offset of a first byte of the data packet and/or (ii) an offset value indicating an offset of a last byte of the data packet.

13. A method, comprising:
   prior to a data packet entering a processing pipeline, generating a data block by encapsulating the data packet with a header portion and a tail portion, wherein the header portion and the tail portion do not include valid information bits;
   receiving, in the processing pipeline, the data block including the data packet, the header portion, and the tail portion;
   in a first processing stage of the processing pipeline, (i) storing the data block, (ii) storing, separately from the data block, additional information associated with the data block, wherein the additional information indicates (a) a length of the data packet within the data block, and (b) a position of the data packet within the data block with respect to at least one of the header portion and the tail portion, and (iii) without modifying a length of the data block,
      either (a) adding bits to the header portion or the tail portion to increase the length of the data packet, or (b) subtracting bits from the data packet to decrease the length of the data packet, and
      modifying the additional information in accordance with (a) the bits added to the header portion or the tail portion or (b) the bits subtracted from the data packet; and
   in a second processing stage subsequent to the first processing stage,
      if the bits were added to the header portion or the tail portion, selectively removing, based on the modified additional information, portions of the header portion or the tail portion that do not include the added bits, and
      if the bits were subtracted from the data packet, selectively removing, based on the modified additional information, the header portion, the tail portion, and the portions of the data packet that correspond to the subtracted bits,
   wherein modifying the additional information in accordance with the bits added to the header portion or the tail portion comprises at least one of:
      (i) storing, in a register, the length of the data packet as a length $n+q+p$, wherein q corresponds to a length of bits added to the tail portion and p corresponds to a length of bits added to the header portion, and storing, in the register, the position of the data packet within the data block with respect to the header portion and the tail portion as an offset $m-p$, and
      (ii) storing, in the register, the length of the data packet as a length $n-r-s$, wherein r corresponds to a number of bits subtracted from the data packet at a header end of the data packet and s corresponds to a number of bits subtracted from the data packet at a tail end of the data packet, and storing, in the register, the position of the data packet within the data block with respect to the header portion and the tail portion as an offset $in+r$.

14. The method of claim 13, wherein selectively removing portions of the header portion and the tail portion that do not include the bits added to the header portion or the tail portion includes, in the second processing stage, (i) removing a number of bits from the header portion corresponding to $m-p$, and ii) removing a number of bits from the tail portion corresponding to $k-q$, wherein k corresponds to a length of the tail portion.

15. The method of claim 13, wherein selectively removing the header portion, the tail portion, and the portions of the data packet that correspond to the subtracted bits includes, in the second processing stage, i) removing a number of bits from the header portion and the header end of the data packet corresponding to $m+r$, and ii) removing a number of bits from the tail portion and the tail end of the data packet corresponding to $k+s$, wherein k corresponds to a length of the tail portion.

* * * * *